United States Patent [19]

Schwyn et al.

[11] Patent Number: 4,931,006
[45] Date of Patent: Jun. 5, 1990

[54] INSTALLATION FOR PRODUCING PACKAGING CONTAINERS

[75] Inventors: Bernhard Schwyn, Luzern; Heinrich Ueberegger, Adetswil, both of Switzerland

[73] Assignee: KMK Karl Maegerle Lizenz AG, Zug, Switzerland

[21] Appl. No.: 192,603

[22] Filed: May 11, 1988

[30] Foreign Application Priority Data

May 13, 1987 [CH] Switzerland ............... 01830/87

[51] Int. Cl.$^5$ .................. B28B 21/70; B28B 21/84; B29L 23/20
[52] U.S. Cl. ...................... 425/412; 264/268; 264/297.7; 264/325; 264/DIG. 41; 425/125; 425/126.1; 425/345; 425/353; 425/361; 425/392; 425/397; 425/398; 425/409; 425/423; 425/454; 425/DIG. 200; 425/DIG. 201
[58] Field of Search ............ 264/DIG. 41, 267, 325, 264/248, 249, 259, 297.7, 297.4, 297.6, 268; 425/126.1, 127, 500, 501, 517, 125, DIG. 201, DIG. 200, DIG. 202, 353, DIG. 218, 434, 435, 357, 358, 348, 345, 344, 259, 261, 340, 110, 112, 117, 125, 108, 397, 453, 128, 418, 423, 576, 258, 383, 392, 393, 359, 360, 361, 352, 394, 398, 409, 454

[56] References Cited

U.S. PATENT DOCUMENTS

| | | | |
|---|---|---|---|
| 2,953,815 | 9/1960 | Mainardi | 264/DIG. 41 |
| 2,994,107 | 8/1961 | Quinche | 264/DIG. 41 |
| 3,058,150 | 10/1962 | Makowski | 425/DIG. 200 |
| 3,149,373 | 9/1964 | Marzillier | 425/DIG. 201 |
| 3,172,933 | 3/1965 | Flax | 264/325 |
| 3,244,788 | 4/1966 | Michel et al. | 425/576 |
| 3,448,496 | 6/1969 | Arnold et al. | 425/453 |
| 3,570,058 | 3/1971 | Heinig et al. | 425/453 |
| 3,677,677 | 7/1972 | Coppola | 425/261 |
| 4,735,761 | 4/1988 | Lindenberger | 425/DIG. 201 |
| 4,755,333 | 7/1988 | Gray | 425/434 |

FOREIGN PATENT DOCUMENTS 3023415  1/1981  Fed. Rep. of Germany .
62-238719 10/1987  Japan ................. 425/576

Primary Examiner—Jeffery Thurlow
Assistant Examiner—Mathieu Vargot
Attorney, Agent, or Firm—Bachman & LaPointe

[57] ABSTRACT

In an installation for producing packaging containers such as tubes, from prefabricated tube bodies and end portions of thermoplastic material, which are connected to the tube bodies, a plurality of moulds which are moved on a circulatory path each include an upwardly directed female mould portion and a mandrel which is pivotable about a horizontal axis between a downwardly directed working position and a loading position. A tube body loading station, a material feed station having a nozzle, and a container unloading station are arranged at spacings from each other along the circulatory path, while the female mould portion and the mandrel of each mould are displaced relative to each other on a common working axis. In a plurality of working units including support frames which are moved on the circulatory path, each support frame supports at least the female mould portion and the mandrel of a mould and the actuating mechanism thereof. The female mould portions and the nozzles are movable relatively to each other and transversely relative to the circulatory path into a common axial position.

12 Claims, 3 Drawing Sheets

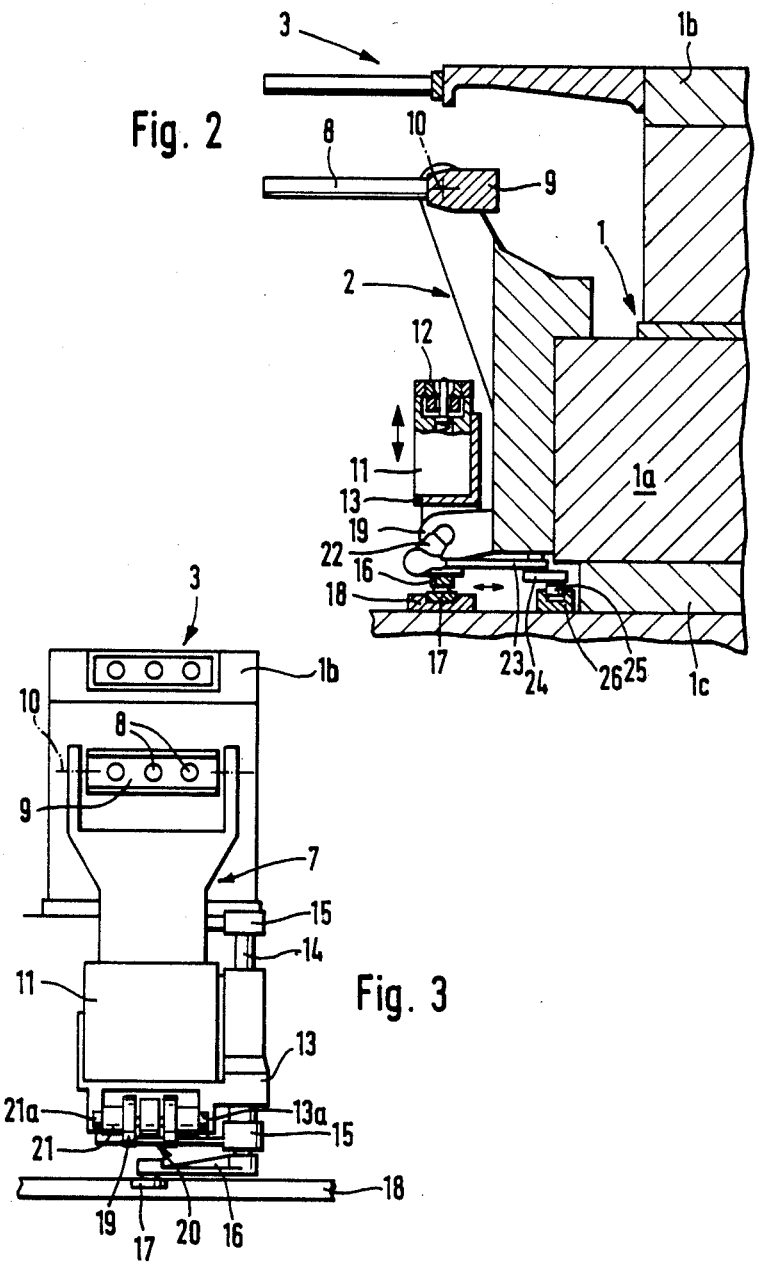

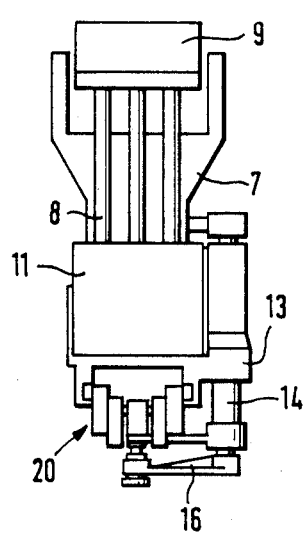
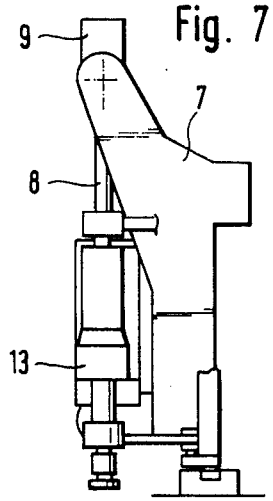
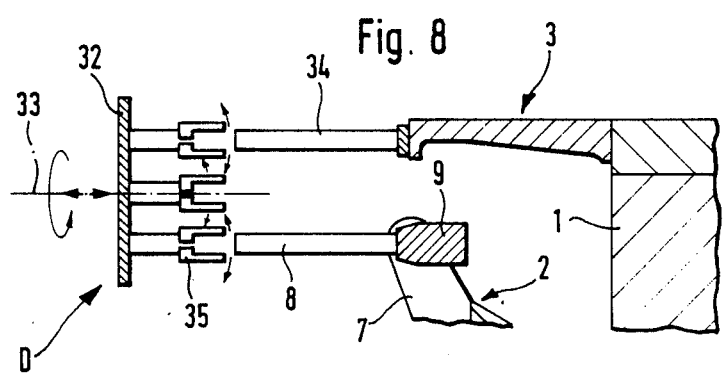

INSTALLATION FOR PRODUCING PACKAGING CONTAINERS

The invention relates to an installation for producing packaging containers in particular, tubes from prefabricated tube bodies and end portions of thermoplastic material which are connected to the tube bodies in a pressing operation.

BACKGROUND OF THE INVENTION

German laid-open application (DE-OS) No. 30 23 415.2 discloses an installation of that kind in which the moulds are arranged on a turntable which is moved with a stepwise motion in a circulatory path. While the female mould portions are rigidly supported on the turntable, the mandrels are fixed thereto pivotably and displaceably along the working axes. The actuating means for producing the displacement of the mandrels are mounted on working stations associated with the turntable. These working stations follow the material feed station in the direction of rotation of the turntable. When the turntable is in a stationary condition, the actuating means act on a respective mandrel to initiate the pressing operation or to produce the withdrawal movement of the mandrel.

In regard to pressing processes of the kind used herein, as the plastic material is introduced into the mould in an open condition, at least that period of time which is required for the mould to be closed or for the pressing force to be applied elapses before the actual deformation operation by pressing begins. If the plastic material is introduced into the female mould portion in a form in which it is plasticised by virture of heat, and if the female mould portion is cooled, as in an industrial use, then the period of time which elapses between the introduction of the material and the pressing operation may have a detrimental effect on the quality and/or the appearance of the pressed article.

In an installation of the specified kind, those considerations are relevant because the material feed nozzle and the female mould portion must occupy a common axial position for the operation of introducing the plastic material.

The residence time of the plastic material in the non-pressed condition in the female mould portion therefore necessarily includes that period of time that the turntable requires to transport the female mould portion from the station which gives the above-mentioned axial position, to the station for initiating the pressing operation.

SUMMARY OF THE INVENTION

Now the object of the invention is to permit a reduction in the residence time of the plastic material in the non-pressed condition in the mould, by virtue of the fact that the pressing operation is carried out independently of the distance and the speed of the movement from a material feed station to a working station for initiating the pressing operation.

In accordance with the invention that object is achieved by the features of the installation of the present invention.

Accordingly, by virtue of the combination not just of the parts of each mould—female mould portion and mandrel—but also the actuating means thereof, to provide a working unit, the pressing operation can begin during the movement of that working unit on the circulatory path.

The working units which are formed by means of support frames in principle make it possible to eliminate a rotary body, for example a turntable for transporting the moulds from one station to another. It is thus possible for the circulatory path of the moulds to be other than circular. For example the circulatory path may have straight portions, along which some or all working stations are arranged.

Irrespective of the form of the circulatory path, the support frames provide the advantage that the forces which must be applied to produce the necessary shaping pressure in the plastic material can be carried in a system which is itself closed, and that facilitates the production of high-quality packaging containers.

BRIEF DESCRIPTION OF THE DRAWING

The invention will be described in greater detail hereinafter by means of an embodiment of an installation and with reference to the accompanying drawings in which:

FIG. 2 shows a part of the installation, partly in vertical section,

FIG. 3 is a front view of a portion from FIG. 2,

FIG. 3 is an elevational view of the material feed station with the female mould portion housing of a working unit.

FIG. 6 is a front view of a working unit in the working position.

FIG. 7 is an elevational view of the working unit shown in FIG. 6, and

FIG. 8 is a diagrammatic elevational view of the transfer station.

DESCRIPTION OF THE PREFERRED EMBODIMENTS

Figure 1:
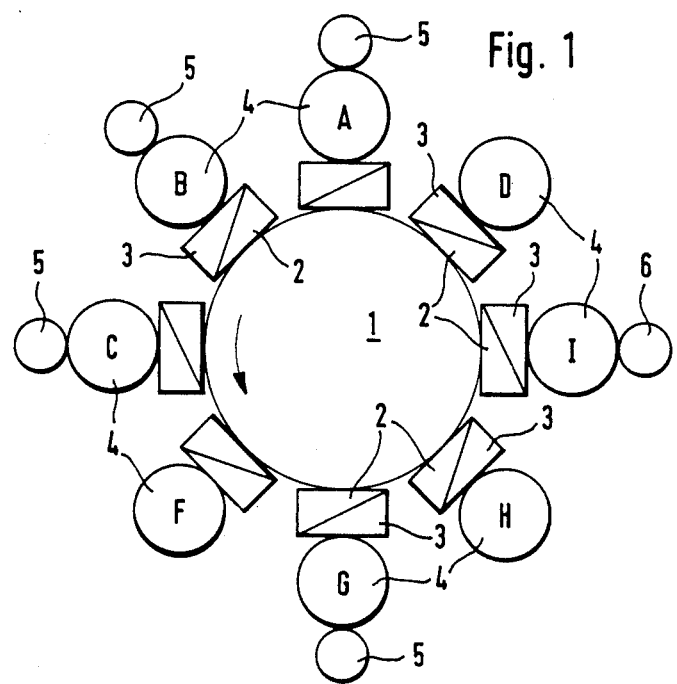
FIG. 1 is a diagrammatic plan view of the installation.

In the installation shown in plan in FIG. 1, for the production of packaging tubes, reference numeral 1 denotes a rotary body which is mounted rotatably about a vertical axis. The rotatry body 1 is connected to a drive (not shown) which moves it with a stepwise motion and which causes it to perform a revolution in eight steps of equal size. Uniformly distributed at its circumference, the rotary body 1 carries eight working units 2 and, above each of those working units, a carrier unit 3. The structure and the mode of operation of the working units 2 and the carrier units 3 are described in greater detail hereinafter.

Arranged in a distributed configuration around the rotary body are stations 4 which, to distinguish between them, are identified by the letters A-D and F-I. In that arrangement the stations A-C cooperate with the working units 2 and the stations F-I co-operate with the carrier units 3 while the station D serves both the working units and the carrier units. Reference numeral 5 denotes feed means which are associated with the stations A, B, C and G while the station I cooperates with a transport means 6 for carrying packaging tubes produced by the installation away.

FIGS. 2 and 3 show a working unit 2 and a carrier unit 3 arranged above same, together with the rotary body 1.

It will be seen from FIG. 2 that the rotary body 1 supports the working units 2 at a lower portion 1a and the carrier units 3 at an upper portion 1b. Each working unit 2 comprises a support frame 7 on which three mandrels 8 are arranged in mutually parallel relationship and are fixed to a mandrel holding means 9 which is pivotable about a horizontal axis. In that arrangement the longitudinal axes of the mandrels 8 intersect the axis of pivotal movement of the mandrel holding means 9, as indicated at 10. On the other hand, the female mould portions 12 are arranged in a housing 11 at a spacing from each other corresponding to the spacing of the mandrels 8, the housing 11 being fixed to a support 13. The support 13 is displaceably guided on a vertical splined shaft 14 which in turn is mounted rotatably in bearings 15 fixed to the support frame 7. The splined shaft 14 carries an arm 16 which engages into a stationary guide track 18, by means of a roller 17 which is fixed at the free end of the arm 16. Finally, supported in bearing elements 19 of the support frame 7 are actuating means 20 which include an eccentric shaft 21 and an actuating lever 22. The eccentric shaft 21 engages by means of eccentric trunnion portions 21a disposed at both ends thereof into groove tracks 13a which are disposed in a horizontally extending position in the support 13. In FIGS. 2 and 3 the support 13 is shown in its lower limit position in which it is supported against an abutment (not shown) on the splined shaft 14. From that lower limit position the support 13 can be pivoted by a link 23 which engages the arm 22 and which in turn is connected to a lever 24 mounted on the support frame 7. A roller 25 fixed to the lever 24 engages into an actuating slideway 26 which extends adjacent to the stationary base 1c of the rotary body 1.

FIGS. 2 and 3 show the mandrel holding means 9 together with the mandrels 8 in a starting position in which the mandrels 8 extend substantially horizontally and, at corresponding stations 4, for example at the stations A and B of the installation, can be loaded with prefabricated parts which are intended for the production of the tubes, such as for example a head insert or a tube body. Such stations, like also the corresponding feed assemblies 5, are known and therefore do not need to be described in detail. Control means (not shown) co-operate with the mandrel holding means 9 in order to move them during the rotary movement of the rotary body, for example from the station B to the station C, from the horizontal position of the mandrels into a downwardly directed vertical position. In that connection, instead of being derived from their own drive, the movement of the control means may be derived from the drive of the rotary body 1 or the stepping movement.

Figure 4:
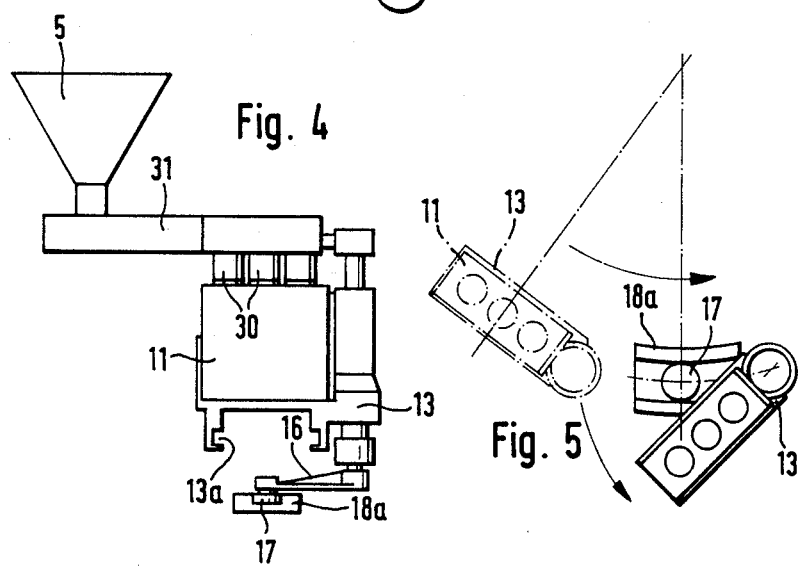
Figure 5:
FIG. 5 is a plan view of two successive female mould portion housings in different positions.

Likewise derived from the stepping movement of the rotary body 1 is the pivotal movement of the support 13 from the starting position shown in FIGS. 2 and 3 into the position shown in FIGS. 4 and 5. That pivotal movement is produced by virtue of the configuration of the guide track 18 from the station B to the station C so that imparted to the arm 16 is a movement in the counter-clockwise direction, which produces a corresponding rotary movement of the splined shaft 14. Just before reaching the station C, the roller 17 on the arm 16 passes out of the rigid guide track 18 into a track portion 18a which is movable radially relative to the axis of the rotary body 1. It will also be seen from FIGS. 4 and 5 that in the outwardly pivoted position the female mould portions 12 are disposed in coaxial relationship under suitably spaced nozzles 30 of a material feed means 31 which is arranged in the station C. The material feed means 31 which as the supply device 5 is provided with a hopper for accommodating granular plastic material supplies the nozzles 30 with the plastic material in a heat-plasticised condition. The nozzles 30 in turn supply the female mould portions with metered amounts of plasticised material in the form of for example blanks which are of an annular configuration.

As soon as the female mould portions 12 have received the plastic material, the support 13 is moved back into its starting position in the clockwise direction by drive means (not shown) which act on the movable track portion 18a, more particularly, in accordance with the invention, before a further stepwise movement of the rotary body 1 has begun. The drive means for the track portion may be formed by a transmission branch which is connected to the drive for the rotary body 1 and thus produce the movement in timed relationship with the corresponding stoppage periods of the rotary body. By virtue of the pivotal movement of the support 13 into its starting position, the groove tracks 13a come into engagement again with the trunnion portions 21a on the eccentric shaft 21, which they left in the preceding pivotal movement into the position shown in FIG. 4.

Now, as soon as a further stepwise movement of the rotary body 1 begins, in which the corresponding working station 2 moves out of the station C, the eccentric shaft 21 is rotated by the engagement of the roller 25 into the actuating slideway 26. In that way the support 13 is moved upwardly on the splined shaft 14, while the female mould portions 12 which already lie on the common working axes with the mandrels 8 can perform the pressing operation, with the mandrels.

It should be added at this point that the mandrels 8 which are provided in station A with insert members for the tube head portion to be produced, are provided with tube portions in station B. When the plasticised material is subjected to the pressing operation, the resulting tube head portion is connected to the corresponding tube portion and to the insert member.

In the position of the components shown in FIGS. 6 and 7, the working units 7 pass through the circulatory path from the station C to a position which corresponds to the station I. In that connection the actuating means 20 holds the support 13 in the pressing position while the tubes or tube head portions are at least partially cooled down by the female mould portions being cooled in a manner not shown in the drawing.

So that the shaping pressure is produced in each mould and is maintained during the cooling phase, the mandrels 8 are arranged to be axially displaceable (not shown) from a rest position in the mandrel holding means 9, more particularly against the force of prestressed springs which are also not shown. In the pressing position of the support 13, the mandrels 8, which have been moved out of their rest position, maintain the shaping pressure by prestressing of the springs.

Each support frame 7 in itself carries the forces required for maintaining the shaping pressure, insofar as both the actuating means 20 which act indirectly on the female mould portions 12 and also the mandrel holding means against which prestressed springs bear are mounted on the support frame.

The guide track 18 extends in its portion adjoining the movable track portion 18a, in a circular configuration with the centre point on the axis of the rotary body 1, and extends unchanged as far as the station B. The movable track portion 18a is moved back into the position shown in FIG. 5 as soon as it has been released by the roller 17 in order to receive the roller 17 of a subsequent working unit upon movement into station C.

In the movement of a working unit to station D, the actuating slideway 26 causes the support 13 to move downwardly into its lower limit position. As soon as the female mould portions 12 have completely released tubes on the mandrels 8, the mandrels 8 are pivoted into the horizontal starting position. In that position the working units go to station D which forms a transfer station for the tubes produced.

As can be seen from FIG. 8, the transfer station D has a rotor 32 which is displaceable between two limit positions for example on a horizontal splined shaft (not shown), the splined shaft being rotated by a drive (not shown) through steps each of 180°. The axis 33 of the splined shaft extends centrally between the planes in which are disposed on the one hand the axes of the mandrels 8 and on the other hand the axes of carrier bodies 34, which correspond in number to the mandrels, of the carrier units 3. The rotor 32 comprises six grippers 35 which face towards the mandrels 8 and the carrier bodies 34 respectively, the grippers 35 being arranged with three thereof in each of two parallel rows. The spacing between the rows corresponds to the spacing between the above-mentioned axes of the mandrels and the carrier bodies. FIG. 8 shows the rotor halfway between two stoppage positions in which the rows lie horizontally and a respective gripper 35 occupies a position coaxial with respect to a mandrel or a carrier body. Of the grippers 35 which are for example pneumatically actuable, those of the lower row can engage tubes on the mandrels 8, pull them off those mandrels by movement of the rotor in the axial direction, pivot them with the rotary movement of the rotor through a step through 180° and move them to the position of the upper row and finally push them on to the carrier bodies 34. In that operation during the rotary movement of the rotor through a stepping movement of the rotary body a subsequent working unit 2 can be passed to the station D so that the grippers transfer the gripped tubes of the preceding working unit to the carrier bodies of the following carrier unit. While the grippers 35 of the upper row release those tubes, the grippers of the lower row can engage those tubes which are on the mandrels 8 of the new working unit, and so on. The displacement of the rotor in the axial direction can be derived from the same drive which imparts the rotary movement thereto.

Further operations can be carried out on the tubes in the plane formed by the carrier units. Thus for example checking operations may take place at the stations F and H while for example at station G caps can be fitted or screwed on after the tubes have practically completely cooled down. Finally, at station I, the tubes are unloaded from the carrier bodies 34 and transferred to a transport means 6.

What is claimed:

1. An installation for producing packaging containers from prefabricated tube bodies and end portions of thermoplastic material which are connected to the tube bodies in a pressing operation, said installation comprising:
   a tube body loading station, a material feed station having a nozzle, and a container unloading station arranged at spacings from each other along a circulatory path;
   a plurality of working units movable along said circulatory path;
   each said working unit including at least one upwardly directed female mould portion and at least one mandrel pivotable about a horizontal axis between a downwardly directed working position and a loading position;
   said at least one female mould portion being arranged in a vertically displaceable housing;
   each said working unit further including a frame for supporting said at least one female mould portion, said housing, said at least one mandrel, and actuating means for displacing said at least one female mould portion in said housing and said at least one mandrel relative to each other along a common working axis; and
   said at least one female mould portion being movable relative to the circulatory path and said nozzle so as to assume a common axial position with said nozzle.

2. An installation according to claim 1 wherein said housing and said at least one female mould portion arranged therein are displaceably guided on said working unit support frame along the working axis and are transversely guided on said working unit support frame between the working axis and a material transfer axis parallel thereto.

3. An installation according to claim 2 wherein:
   each said working unit support frame includes means for holding said at least one mandrel;
   said mandrel holding means being pivotable about a horizontal axis; and
   each said working unit further including a vertically displaceable female mould support pivotable about a vertical axis.

4. An installation according to claim 3 wherein:
   a plurality of mandrels are positioned within said mandrel holding means;
   said mandrels being axially displaceably guided by said mandrel holding means and being held in a starting position under the effect of prestressing means;
   each working unit having a number of female mould portions corresponding to said plurality of mandrels;
   said female mould portions being arranged in said housing; and
   said material feed station having a number of nozzles corresponding to the number of female mould portions in said housing.

5. An installation according to claim 4 wherein:
   each mandrel in said mandrel holding means has a longitudinal axis; and
   said longitudinal axes lie in a plane containing the pivot axis of said mandrel holding means.

6. An installation according to claim 3 wherein:
   said displaceable female mould support is guided on a vertical splined shaft rotatably mounted in said support frame; and
   linkage means connected to said splined shaft for pivoting said shaft about said vertical axis.

7. An installation according to claim 1 further comprising:
   a rotary body; and
   said support frames being rigidly fixed to the periphery of said rotary body.

8. An installation according to claim 7 wherein said rotary body is mounted in a machine base having slideways.

9. An installation for producing packaging containers from prefabricated tube bodies and end portions of thermoplastic material which are connected to the tube bodies in a pressing operation, said installation comprising:
- a tube body loading station, a material feed station having a nozzle, and a container unloading station arranged at spacings from each other along a circulatory path;
- a plurality of working units movable along said circulatory path;
- each said working unit including at least one upwardly directed female mould portion and at least one mandrel pivotable about a horizontal axis between a downwardly directed working position and a loading position;
- each said working unit further including a frame for supporting said at least one female mould portion, said at least one mandrel, and actuating means for displacing said at least one female mould portion and said at least one mandrel relative to each other along a common working axis;
- said at least one female mould portion being movable relative to the circulatory path and to said nozzle into a common axial position with said nozzle;
- a carrier unit arranged above each working unit and rotating synchronously therewith;
- at least one working station disposed along the circulatory path associated with each said carrier unit; and
- a transfer station having grippers for taking packaging containers from a respective working unit and transferring said containers to a respective carrier unit.

10. An installation according to claim 9 further comprising:
- each said carrier unit being fixed to a rotary body.

11. An installation according to claim 10 wherein:
- each said carrier unit has a number of horizontally disposed carrier bodies corresponding to an equal number of mandrels associated with a respective working unit.

12. An installation according to claim 9 further comprising:
- said transfer station further having a rotor associated with said grippers; and
- said rotor being moved with a stepwise motion about a horizontal axis and being axially pivotable between two positions.

* * * * *